(12) United States Patent
Patel

(10) Patent No.: US 12,416,766 B2
(45) Date of Patent: Sep. 16, 2025

(54) FUSION SPLICED CONNECTOR

(71) Applicant: Panduit Corp., Tinley Park, IL (US)

(72) Inventor: Satish I. Patel, Roselle, IL (US)

(73) Assignee: Panduit Corp., Tinley Park, IL (US)

( * ) Notice: Subject to any disclaimer, the term of this patent is extended or adjusted under 35 U.S.C. 154(b) by 233 days.

(21) Appl. No.: 17/978,566

(22) Filed: Nov. 1, 2022

(65) Prior Publication Data

US 2024/0142717 A1     May 2, 2024

(51) Int. Cl.
*G02B 6/38*     (2006.01)
*G02B 6/255*    (2006.01)

(52) U.S. Cl.
CPC ......... *G02B 6/3846* (2013.01); *G02B 6/2558* (2013.01); *G02B 6/3851* (2013.01); *G02B 6/2551* (2013.01); *G02B 6/3888* (2021.05)

(58) Field of Classification Search
CPC .. G02B 6/2551; G02B 6/2558; G02B 6/3846; G02B 6/3851; G02B 6/3888
See application file for complete search history.

(56) References Cited

U.S. PATENT DOCUMENTS

| | | | | |
|---|---|---|---|---|
| 7,011,454 B2 * | 3/2006 | Caveney | ............ | G02B 6/3879 385/59 |
| 7,806,600 B2 * | 10/2010 | Marrs | ............ | G02B 6/3802 385/60 |
| 8,047,726 B2 | 11/2011 | Tamekuni et al. | | |
| 8,070,367 B2 * | 12/2011 | Winberg | ............ | G02B 6/38875 385/75 |
| 8,317,406 B2 | 11/2012 | Tamekuni et al. | | |
| 8,408,811 B2 * | 4/2013 | de Jong | ............ | G02B 6/3846 385/69 |
| 2009/0022457 A1 | 1/2009 | De Jong et al. | | |
| 2020/0150374 A1 | 5/2020 | De Jong et al. | | |

FOREIGN PATENT DOCUMENTS

| | | | | |
|---|---|---|---|---|
| CN | 1800897 A | | 7/2006 | |
| CN | 114488417 A | * | 5/2022 | ........... G02B 6/3855 |

OTHER PUBLICATIONS

English Translation for CN 114488417 A, 14 pages (Year: 2022).*

* cited by examiner

*Primary Examiner* — Daniel Petkovsek
(74) *Attorney, Agent, or Firm* — Christopher K. Marlow; Christopher S. Clancy; James H. Williams

(57) ABSTRACT

An optical connector which houses and holds a fusion spliced portion in which a short optical fiber fitted to an optical connector ferrule is fusion-spliced with a buffered optical fiber. One end of a protection sleeve which reinforces said fusion spliced portion is configured to be coupled to said optical connector ferrule. The protection sleeve has an inner sleeve and a clamping sleeve wherein the inner sleeve is configured to be inserted into the clamping sleeve. The end of the inner sleeve distal from the ferrule is configured to have a clamping feature that is activated when the inner sleeve is inserted into the clamping sleeve.

5 Claims, 12 Drawing Sheets

FUSION SPLICED CONNECTOR

FIELD OF THE INVENTION

The present invention relates generally to fusion spliced fiber connectors and more specifically to a method and apparatus of protecting the fusion spliced fiber in the connector.

BACKGROUND

To make a connection with field fiber using a splice-on connector approach, Panduit currently offers mechanical splice-on connectors under Opticam name in LC, SC and ST styles as detailed in U.S. Pat. Nos. 7,011,454 and 8,256,970. The Opticam connectors feature factory polished ferrule with stub fiber disposed in index matching gel inside the connector. For termination, field fiber is stripped, cleaned, and cleaved to a set length and inserted into the connector to align with the stub fiber through index matching gel. Once field fiber is aligned, cam action buffer clamp secures the field fiber into place to prevent any movement. The Opticam mechanical splice-on connectors are easy to terminate and do not require expensive termination tools. It uses index matching gel to transfer signal from field fiber to stub fiber. As optical property of the glass and gel is not identical, mechanical splice-on connectors have higher insertion loss.

What is needed is a fusion splice type splice-on connector where glass is fused thermally to offer lowest loss connector. This type of connector was not preferred in the industry due to the extremely high cost of the fusion splice equipment, but lately cost of fusion splice equipment has come down to make this type of connector cost effective for field use.

SUMMARY

An optical connector which houses and holds a fusion spliced portion in which a short optical fiber fitted to an optical connector ferrule is fusion-spliced with a buffered optical fiber. One end of a protection sleeve which reinforces said fusion spliced portion is configured to be coupled to said optical connector ferrule. The protection sleeve has an inner sleeve and a clamping sleeve wherein the inner sleeve is configured to be inserted into the clamping sleeve. The end of the inner sleeve distal from the ferrule is configured to have a clamping feature that is activated when the inner sleeve is inserted into the clamping sleeve.

DESCRIPTION OF THE INVENTION

The present invention is a splice-on fusion splice connector with a splice protection sleeve featuring mechanical buffer clamps. The invention shown here is for an LC style connector, but this invention can be implemented in SC or ST style fiber optic connectors.

Figure 1:
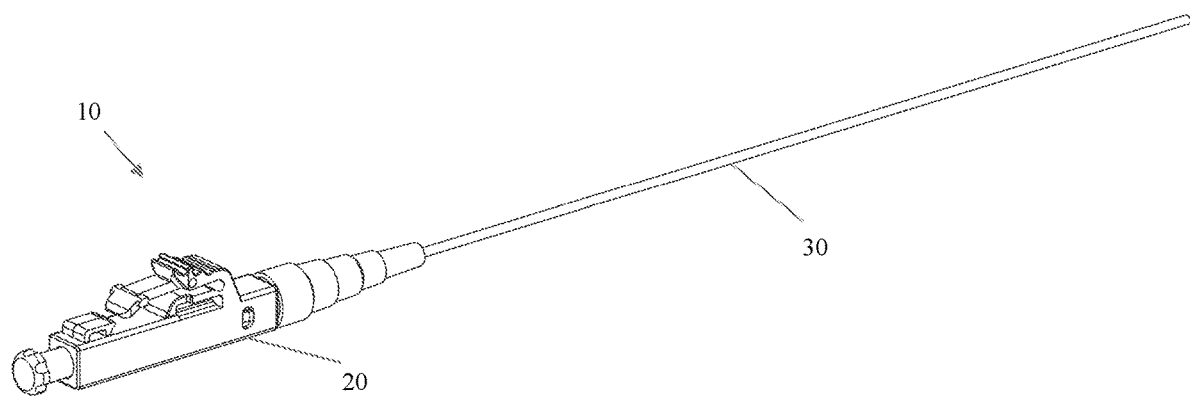
FIG. 1 shows trimetric view of fusion splice connector assembly 10.

FIG. 1 shows trimetric view of fusion splice connector assembly 10. Fusion splice connector 20 is terminated to fiber optic cable 30.

Figure 2:
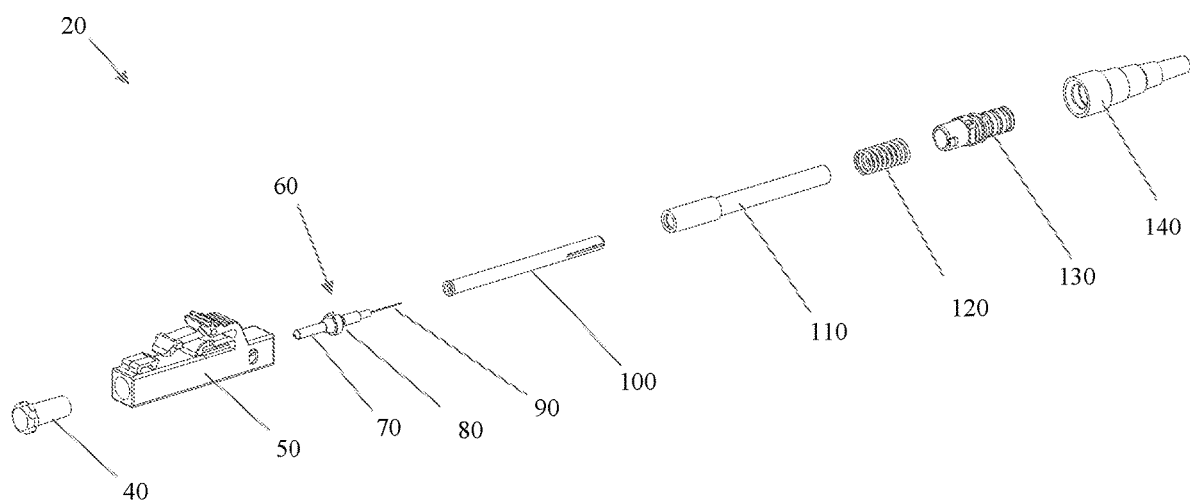
FIG. 2 is an exploded view of fusion splice connector 20.

FIG. 2 is an exploded view of fusion splice connector 20. Fusion splice connector 20 includes ferrule dust cap 40, connector housing 50, ferrule assembly 60, protective inner sleeve 100, clamping sleeve 110, spring 120, backbone 130 and boot 140. Ferrule assembly 60 includes ferrule 70, ferrule holder 80 and fiber 90.

Figure 3:
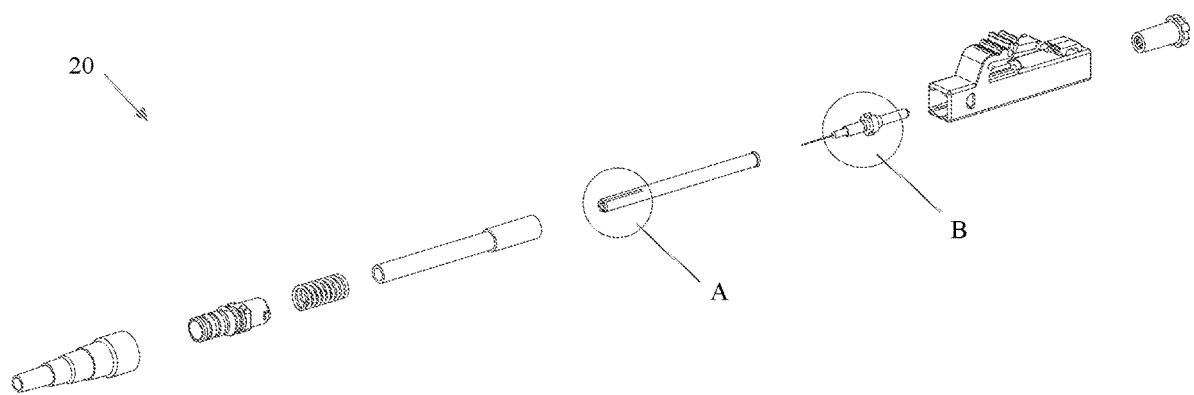
FIG. 3 is an exploded 180-degree rotated vertical axis view showing protective sleeve 100 cable buffer clamping end detail "A" and ferrule assembly 60 detail "B" locations.

FIG. 3 is an exploded 180-degree rotated vertical axis view showing protective sleeve 100 cable buffer clamping end detail "A" and ferrule assembly 60 detail "B" locations.

Figure 4:
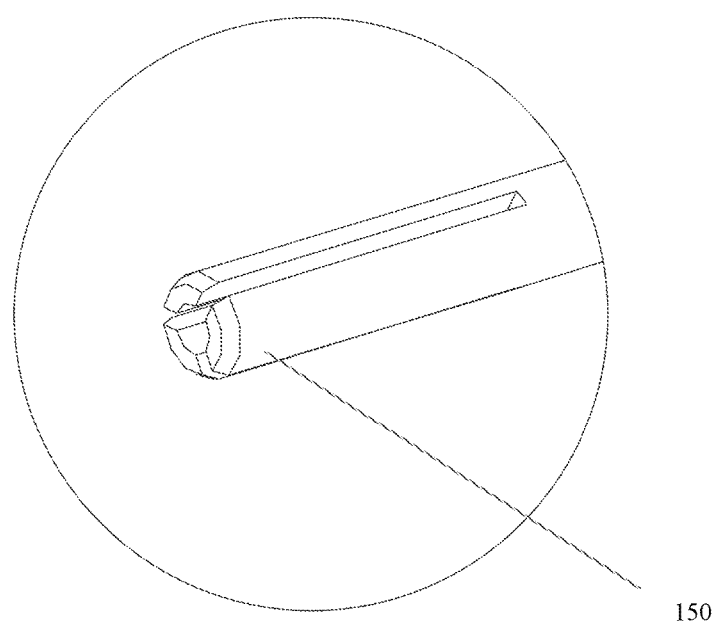
FIG. 4 is protective sleeve 100 cable buffer clamping end detail "A" view scaled to show buffer clamp 150.

FIG. 4 is protective inner sleeve 100 cable buffer clamping end detail "A" view scaled to show buffer clamp 150.

Figure 5:
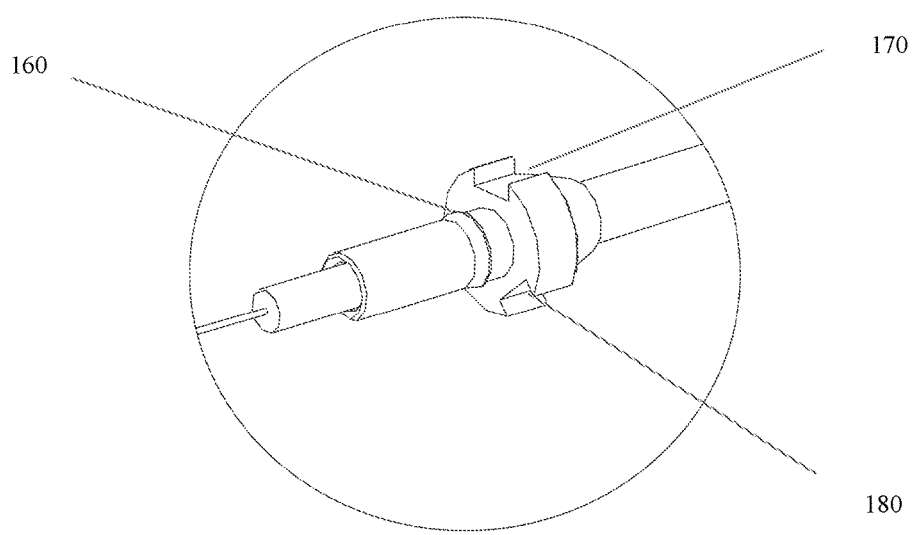
FIG. 5 is a detail "B" view scaled to show ferrule assembly top keying notch 170, side keying notch 180 and sleeve retaining feature 160.

FIG. 5 is a detail "B" view scaled to show ferrule assembly top keying notch 170, side keying notch 180 and sleeve retaining feature 160.

Figure 6:
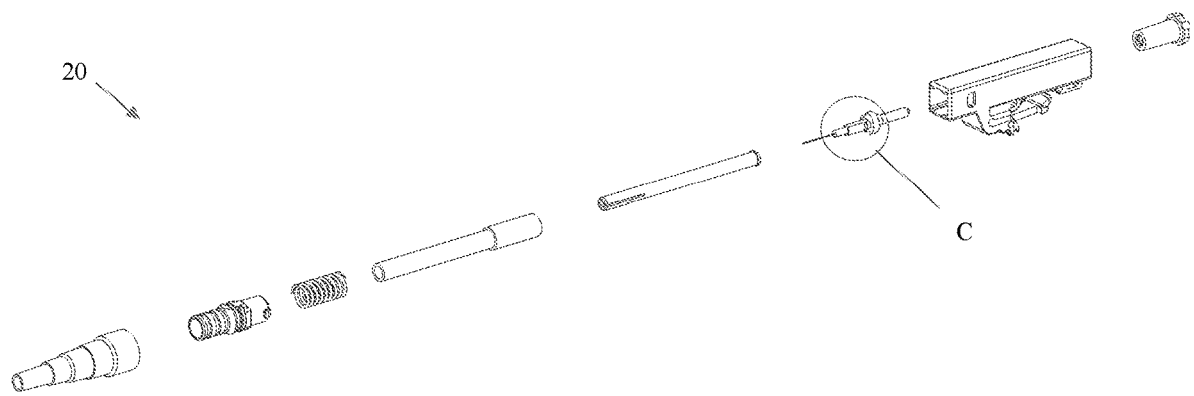
FIG. 6 is an exploded trimetric view rotated 180-degrees vertical axis and axis passing thru the connector.

FIG. 6 is an exploded trimetric view rotated 180-degrees vertical axis and axis passing thru the connector. Detail "C" is called out in this view.

Figure 7:
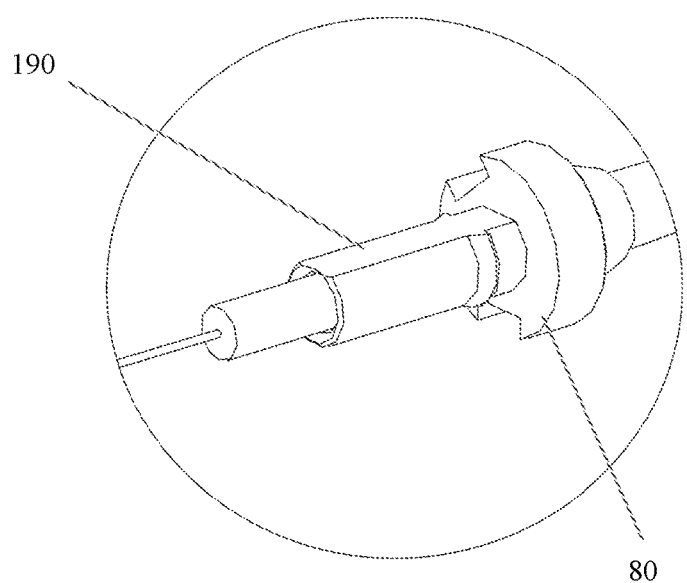
FIG. 7 is a detail "C" view showing ferrule holder flat 190 on ferrule holder 80.

FIG. 7 is a detail "C" view showing ferrule holder flat 190 on ferrule holder 80.

Figure 8:
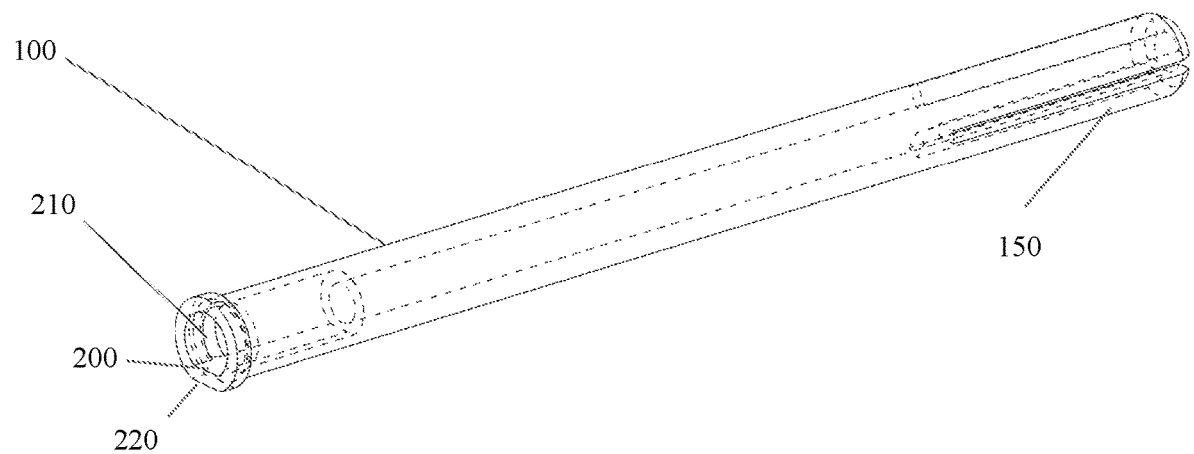
FIG. 8 is a trimetric view of protective sleeve 100 showing inner keying flat 200, retaining groove 210, outer keying flat 220 and buffer clamp 150.

FIG. 8 is a trimetric view of protective inner sleeve 100 showing inner keying flat 200, retaining groove 210, outer keying flat 220 and buffer clamp 150. During assembly ferrule holder flat 190 is aligned with the protective sleeve inner keying flat 200 to prevent protective sleeve rotation and retaining groove 210 slides over ferrule holder sleeve retaining feature 160 to prevent it from coming off.

Figure 9:
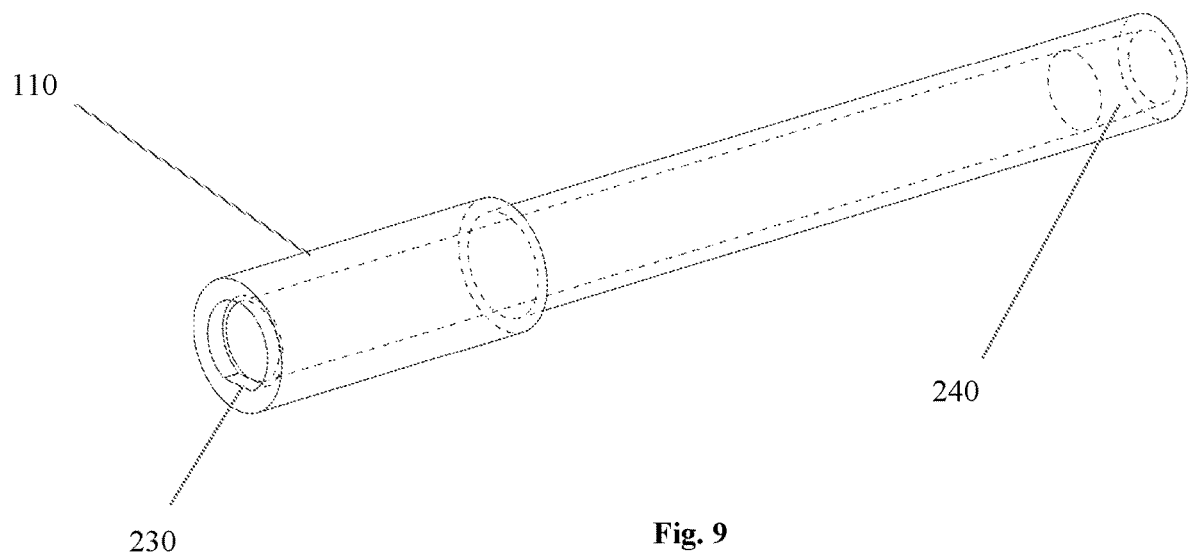
FIG. 9 is a trimetric view of clamping sleeve 110 showing clamping sleeve keying flat 230 and tapered section 240.

FIG. 9 is a trimetric view of clamping sleeve 110 showing clamping sleeve keying flat 230 and tapered section 240. Protective sleeve outer keying flat 220 aligns with clamping sleeve keying flat 230 to prevent clamping sleeve 110 rotation. Clamping sleeve tapered section 240 forces protective inner sleeve 100 buffer clamps 150 towards the fiber cable 30 to create a firm clamping force.

Figure 10:
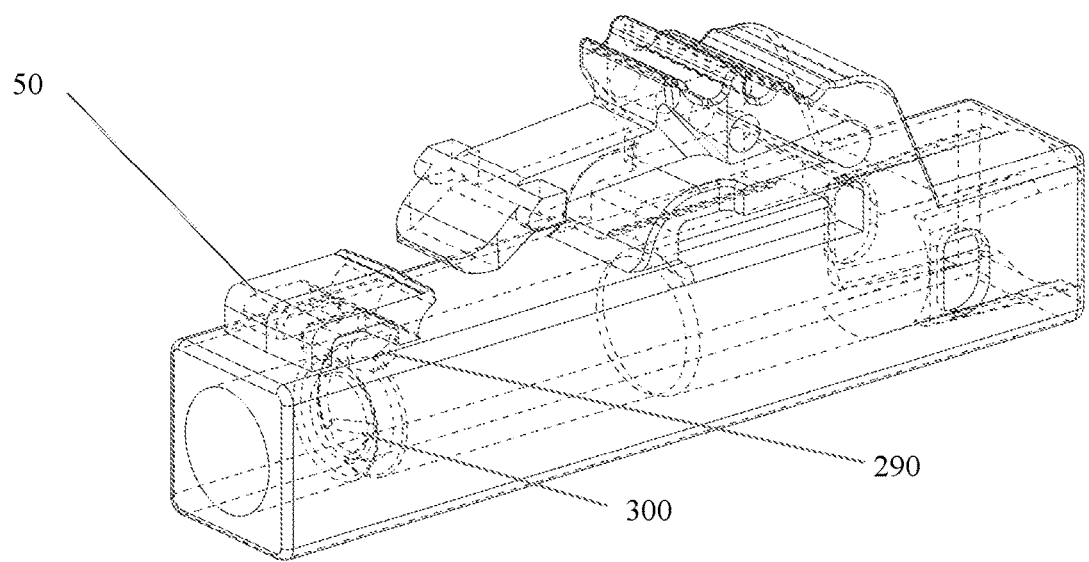
FIG. 10 is a trimetric view of connector housing 50 showing ferrule top keying feature 290 and ferrule side keying feature 300.

FIG. 10 is a trimetric view of connector housing 50 showing ferrule top keying feature 290 and ferrule side keying feature 300.

Figure 11:
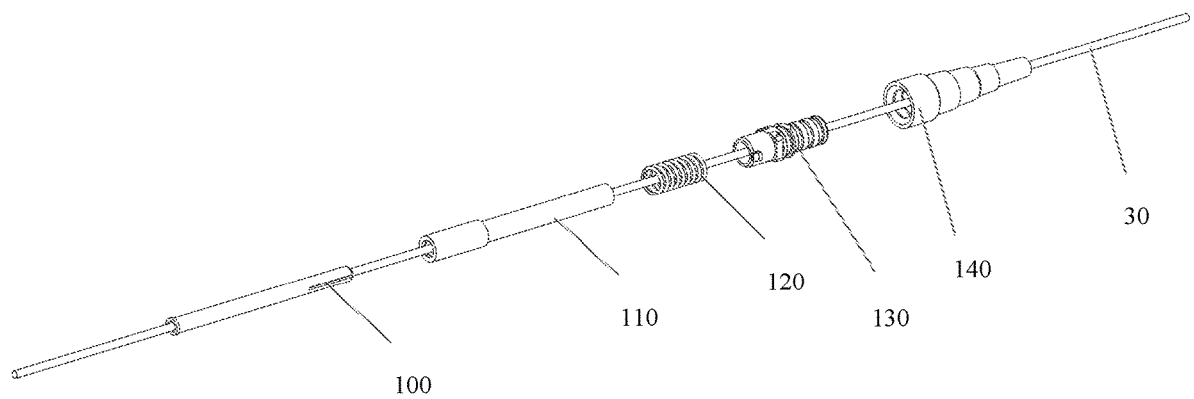
FIG. 11 is an exploded view showing assembly step 1.

FIG. 11 is an exploded view showing assembly step 1. In this step boot 140, backbone 130, spring 120, clamping sleeve 110 and protective sleeve 100 are threaded on to fiber optic cable 30.

Figure 12:
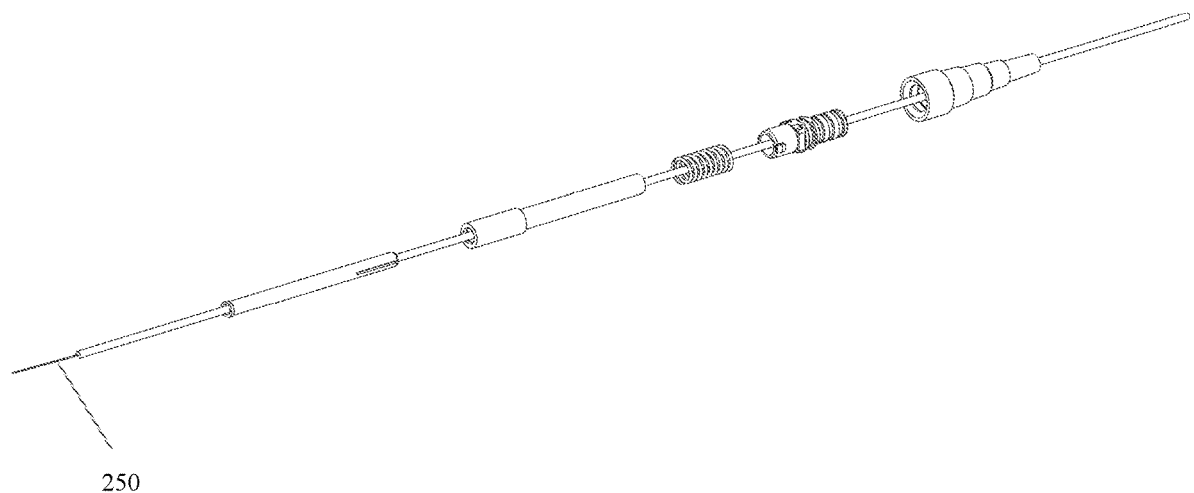
FIG. 12 shows assembly step 2.

FIG. 12 shows assembly step 2. In this step buffer is stripped, and glass fiber 250 is cleaved to a specified length.

Figure 13:
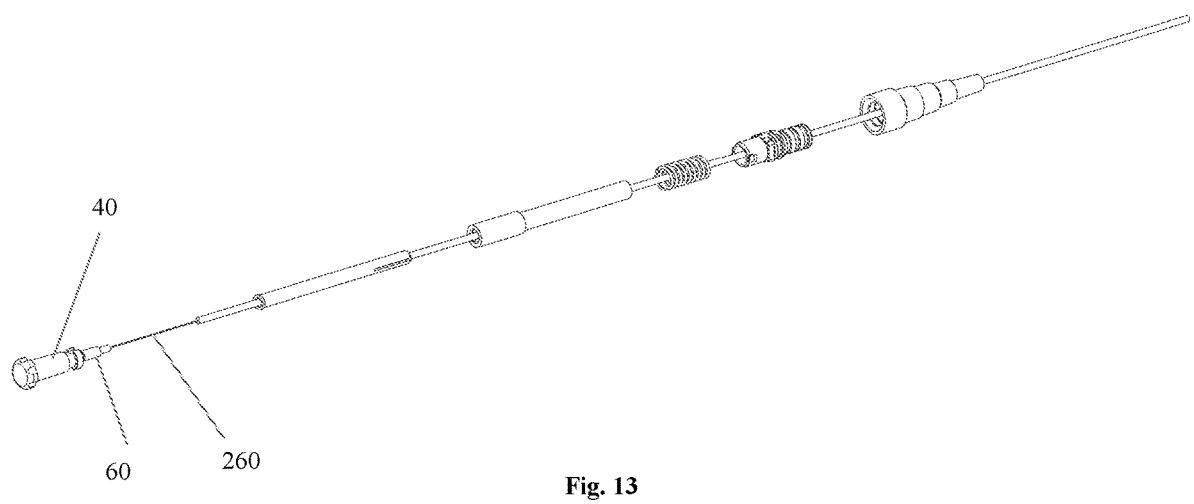
FIG. 13 shows assembly step 3.

FIG. 13 shows assembly step 3. In this step ferrule assembly 60 assembled with ferrule dust cap 40 is fusion spliced to cleaved glass fiber 250 at fusion splice point 260 using fusion splice equipment.

Figure 14:
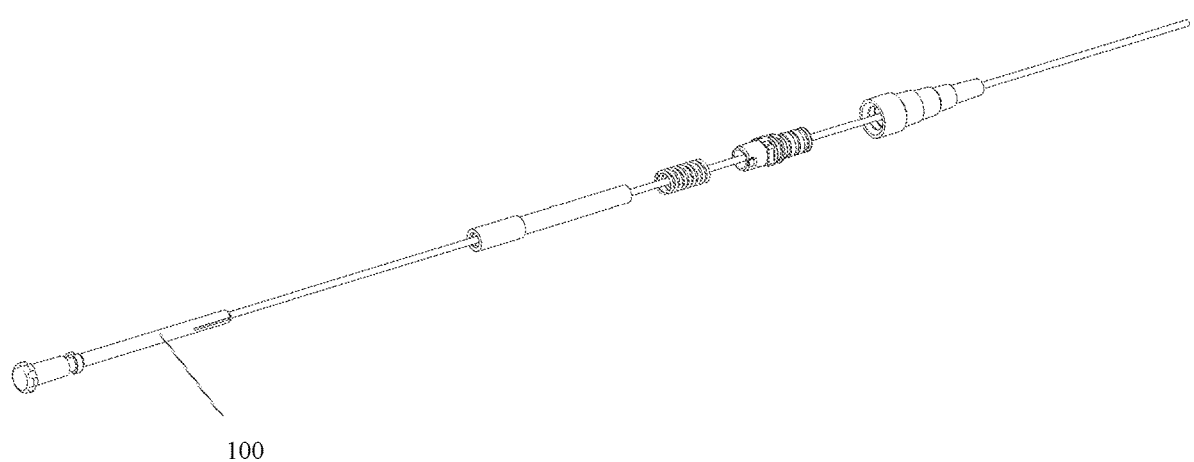
FIG. 14 shows assembly step 4.

FIG. 14 shows assembly step 4. In this step protective sleeve is slipped over the ferrule assembly while aligning protection sleeve inner keying flat 200 with ferrule holder flat 190. Protective sleeve is pushed all the way to engage sleeve retaining feature 160 with retaining groove 210.

Figure 15:
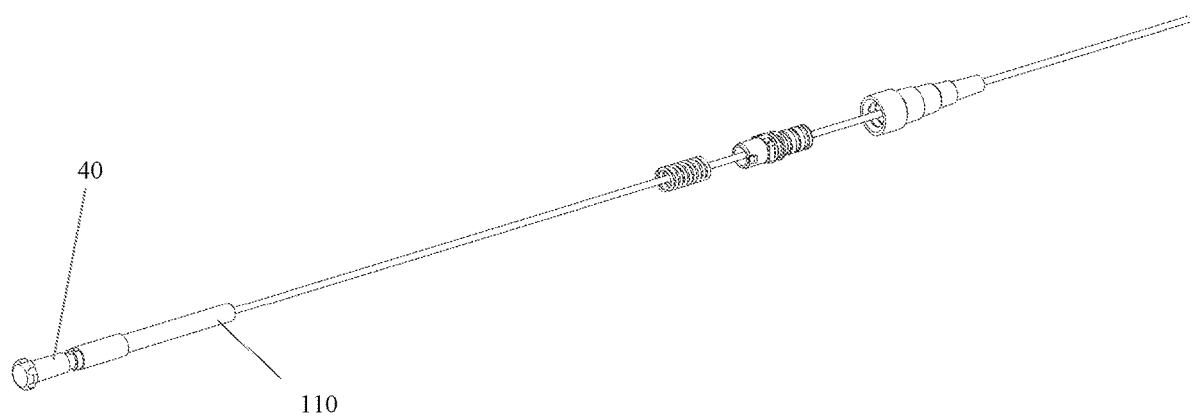
FIG. 15 shows assembly step 5.

FIG. 15 shows assembly step 5. In this step clamping sleeve 110 is slipped over the protective sleeve 100 while aligning protective sleeve outer keying flat 220 with clamping sleeve keying flat 230. Clamping sleeve tapered section 240 pushes buffer clamp 150 to clamp the cable 30.

Figure 16:
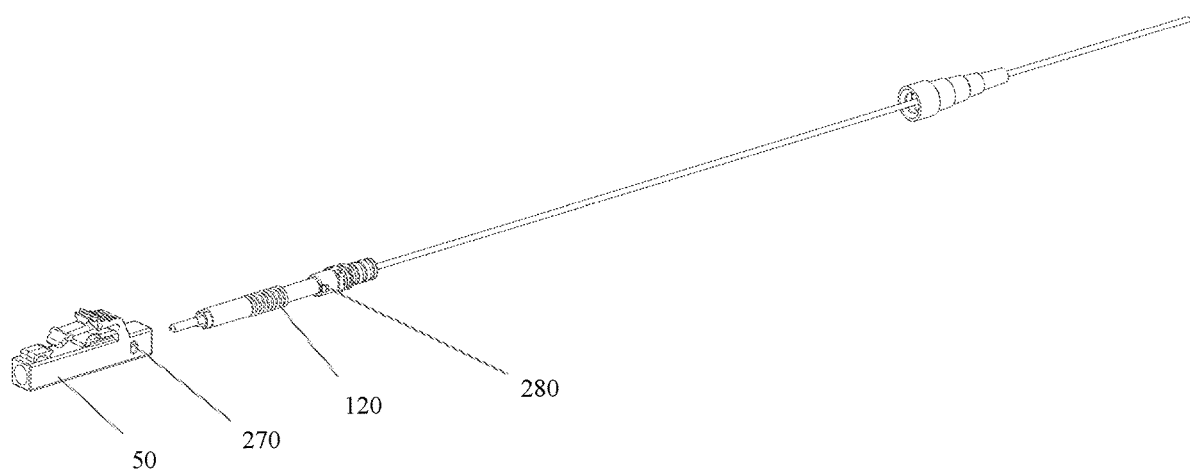
FIG. 16 shows assembly step 6.

FIG. 16 shows assembly step 6. In this step ferrule dust cap 40 is removed, spring 120 and backbone 130 are positioned to assembled with the housing 50 to engage backbone latches 280 in housing latch windows 270. Housing 50 ferrule top keying feature 290 and ferrule side keying feature 300 are aligned to top keying notch 170 and side keying notch 180 respectively.

Figure 17:
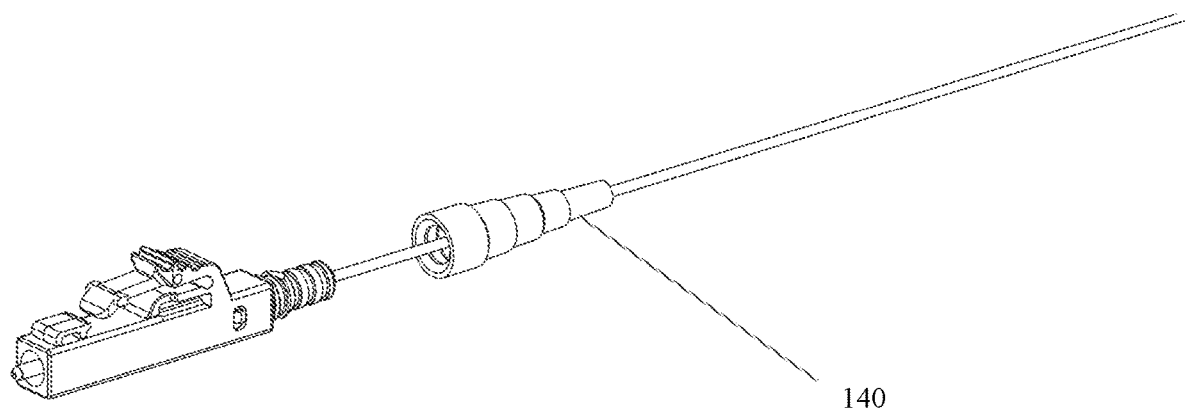
FIG. 17 shows assembly step 7.

FIG. 17 shows assembly step 7. In this step boot 140 is pushed over the backbone 130 to complete the assembly.

Figure 18:
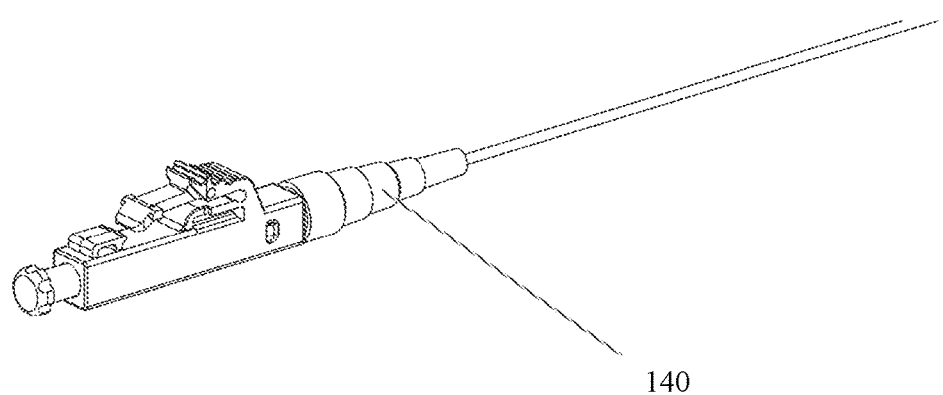
FIG. 18 shows assembled connector 10.

FIG. 18 shows assembled connector 10.

Figure 19:
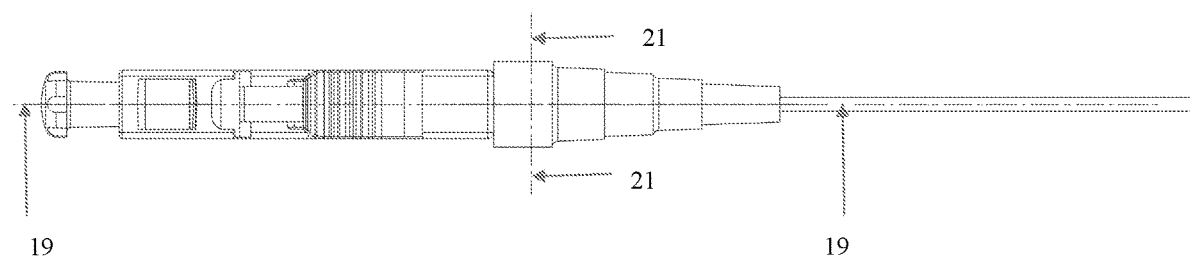
FIG. 19 is a top view showing section lines 19 and 21.

FIG. 19 is a top view showing section lines 19 and 21.

Figure 20:
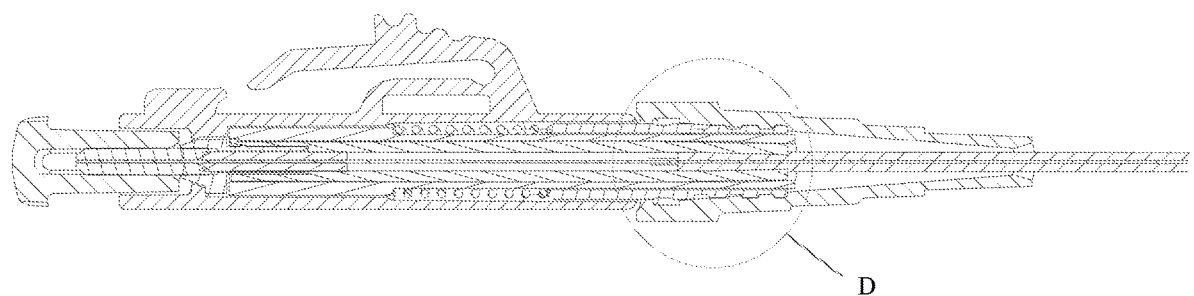
FIG. 20 is a section view passing thru line 19 in FIG. 19.

FIG. 20 is a section view passing thru line 19 in FIG. 19.

Figure 21:
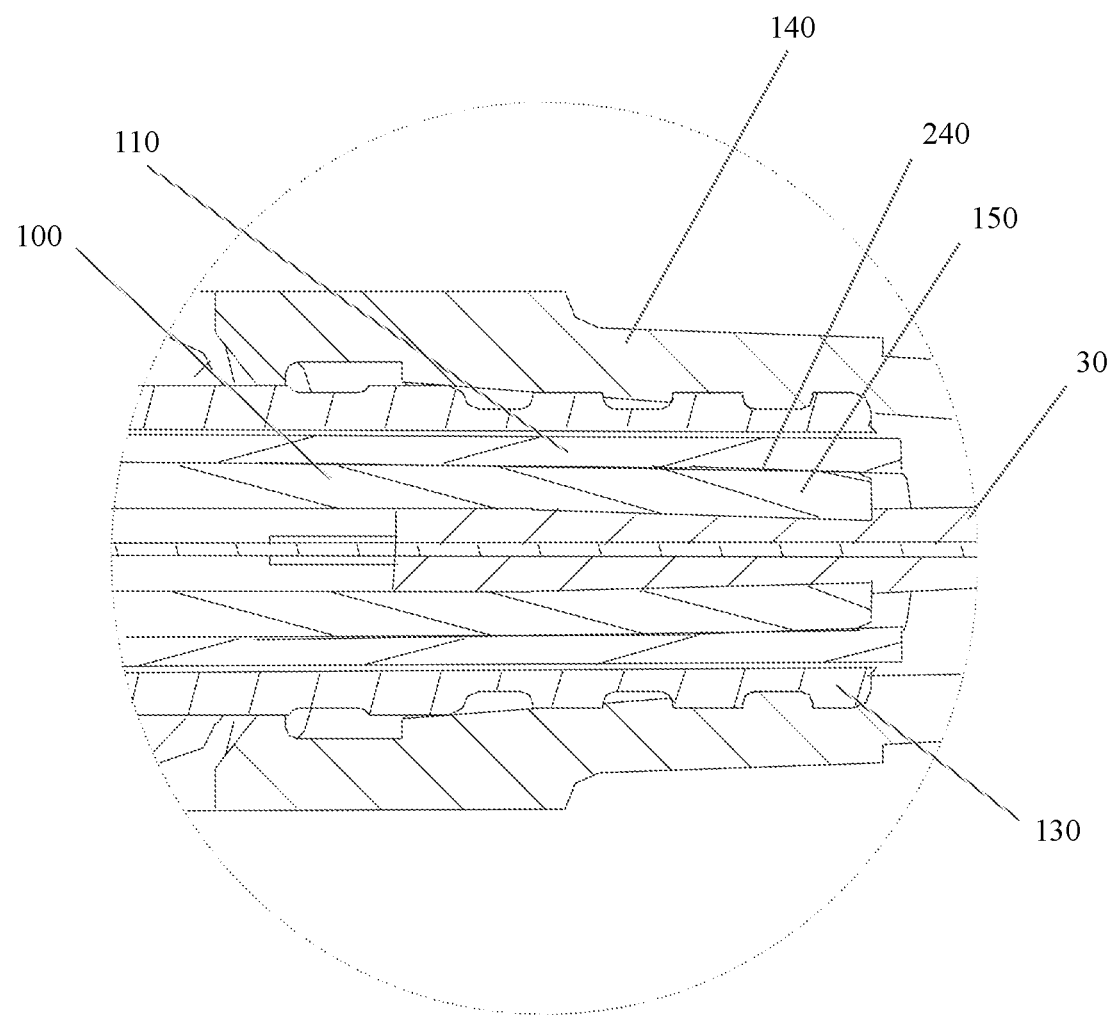
FIG. 21 is a detail "D" showing clamping sleeve taper section 240 pressing buffer clamps 150 in a clamping position over cable 30.

FIG. 21 is a detail "D" showing clamping sleeve taper section 240 pressing buffer clamps 150 in a clamping position over cable 30.

Figure 22:
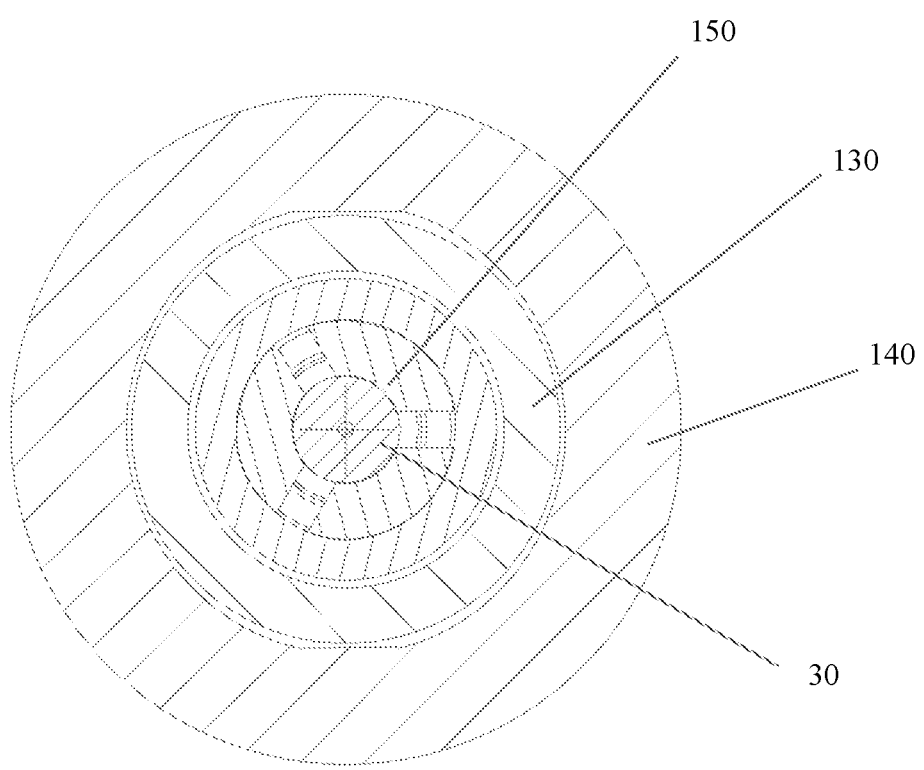
FIG. 22 is a section view along line 21 in FIG. 19.

FIG. 22 is a section view along line 21 in FIG. 19. It shows crimp sleeve tapered section 240 pressing on buffer clamps 150.

The invention claimed is:

1. An optical connector which houses and holds a fusion spliced portion where a short optical fiber fitted to an optical connector ferrule is fusion-spliced with a buffered optical fiber comprising:
    a housing;
    said fusion spliced portion; and
    a protection sleeve within the housing which reinforces said fusion spliced portion and is configured to be coupled to a ferrule holder, wherein said protection sleeve includes an inner sleeve and a clamping sleeve wherein the inner sleeve is configured to be inserted and fully enclosed by the clamping sleeve and further wherein an end of the inner sleeve distal from the ferrule holder is configured to have a clamping feature that is activated when the inner sleeve is inserted into the clamping sleeve.

2. The optical connector of claim 1, wherein the clamping feature is a buffer clamp on the inner sleeve that is activated by a tapered section of the clamping sleeve engaging the buffer clamp of the inner sleeve.

3. The optical connector of claim 1, wherein the ferrule holder has a sleeve retaining feature that is configured to engage a retaining groove on the inner sleeve.

4. The optical connector of claim 1, wherein the ferrule holder has a ferrule holder flat configured to engage an inner keying flat on the inner sleeve.

5. The optical connector of claim 4, wherein the inner sleeve also has an outer keying flat configured to engage a keying flat of the clamping sleeve.

* * * * *